May 14, 1935.  H. A. FLETCHER  2,001,189
CONTROLLABLE PITCH PROPELLER
Original Filed June 19, 1931   2 Sheets-Sheet 2
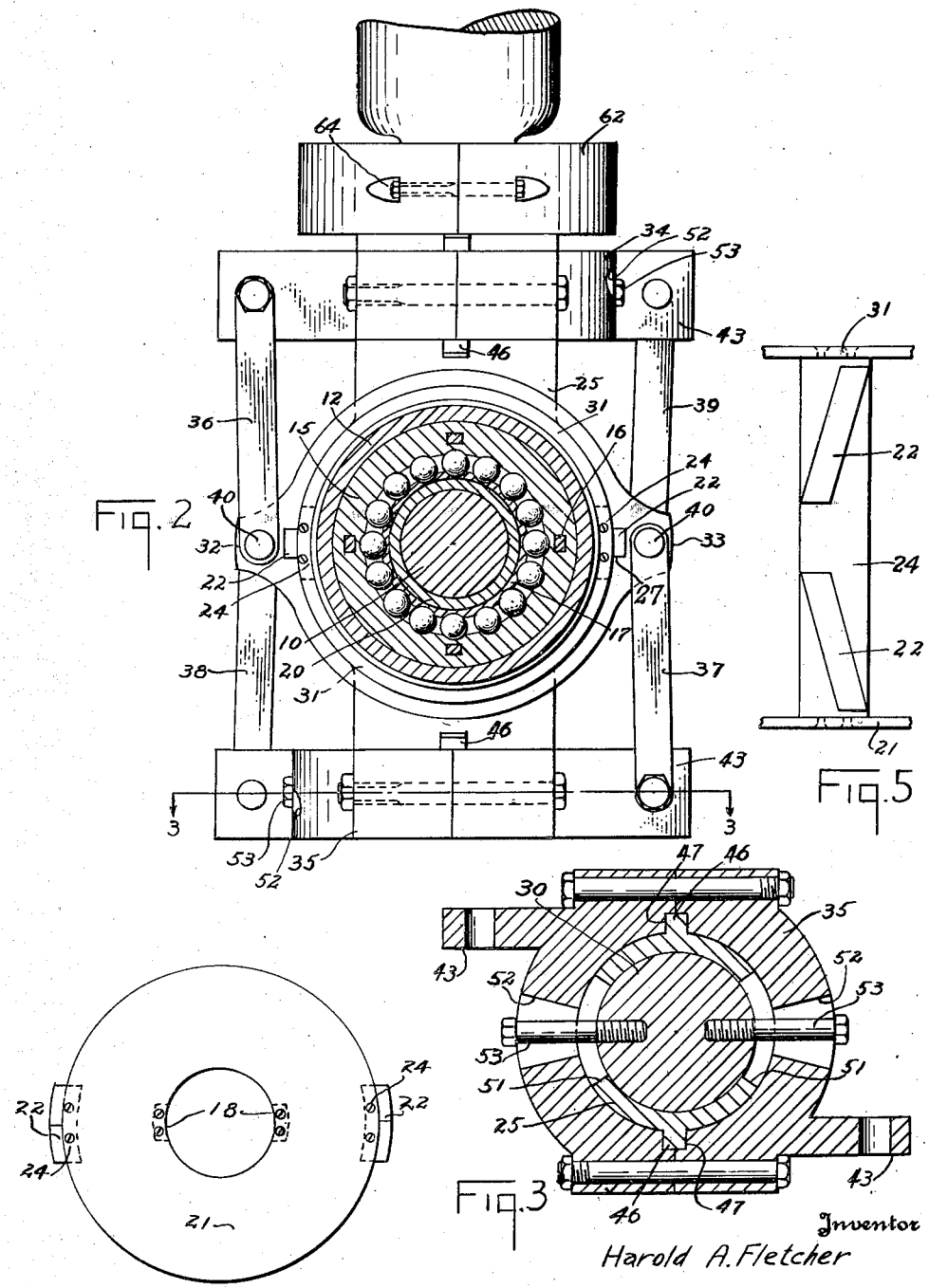

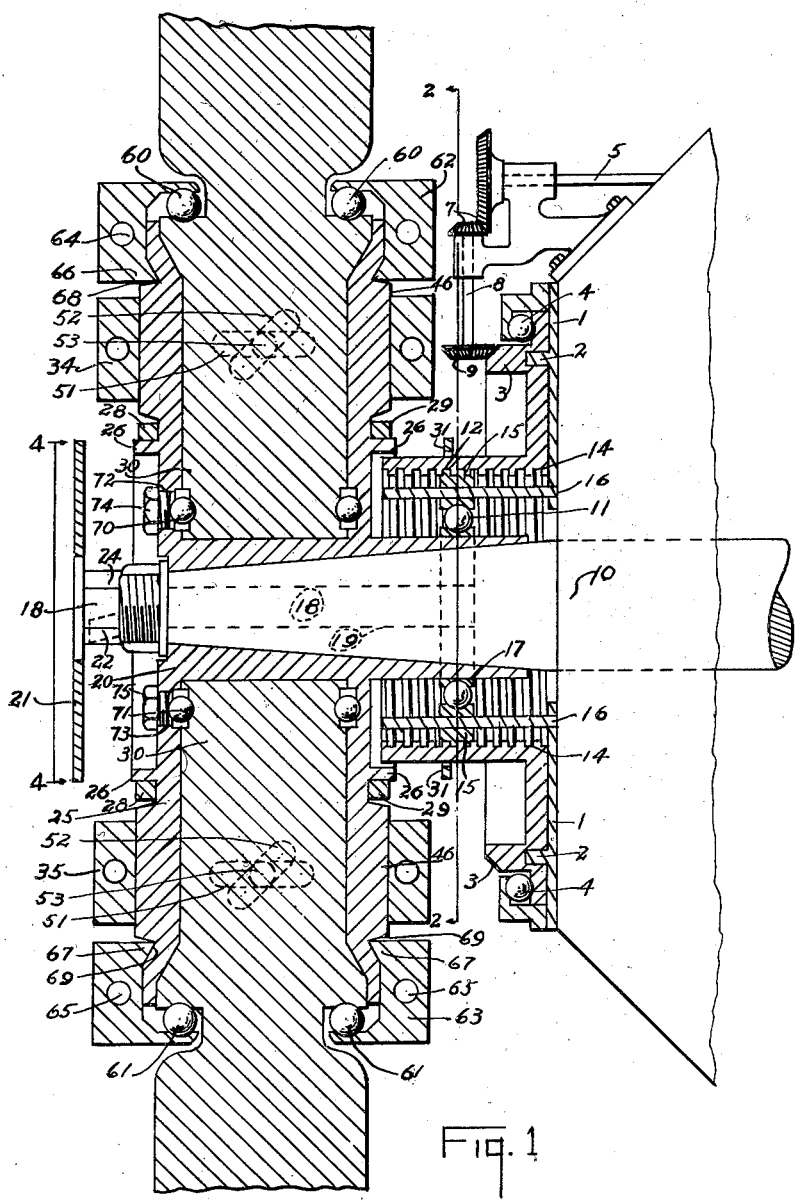

Patented May 14, 1935

2,001,189

UNITED STATES PATENT OFFICE 2,001,189

CONTROLLABLE PITCH PROPELLER

Harold A. Fletcher, Chicago, Ill.

Application June 19, 1931, Serial No. 545,470
Renewed June 16, 1933

20 Claims. (Cl. 170—163)

This invention relates to propellers having blades whose pitch is variable and reversible during flight. It is desirable in propellers for aircraft, particularly airplanes, that the pitch be rendered adjustable to the degree of reversal, so that in "taking off", the pitch of the propeller may be adjusted to produce the most effective traction, and when the machine is in flight the pitch may be changed to produce more efficient traction in the air, and then by reversing the pitch, a braking effect may be produced in landing. During flight, there are various air conditions which make variation in the pitch of the propeller desirable, such, for example, the ability to come to a substantially complete stop, and then drop out of the way of an oncoming plane to avoid collision. Moreover, an aircraft traveling in rarified air operates more efficiently when the pitch of the propeller may be varied. With the propeller meeting these conditions, at the most efficient pitch, heavier load, quicker climb, and speedier and more efficient flying at any altitude is obtained.

The invention contemplates the provision of means for rendering most effective the propeller traction in various conditions of flight and has for an object to effect a corresponding economy in the use of the explosive fuel in the engine at times when the propeller is operating at high efficiency at any desirable R. P. M.

The invention embraces the utilization of a propeller of this character having blades rotatable about a longitudinal axis to vary the pitch, together with mechanism to effect such rotation, which mechanism is of rigid and durable construction and may be operated by comparatively small and effortless movement of the controls.

The invention contemplates the provision of a propeller of this kind having controllable pitch regulation in which the regulating mechanism is exposed to minimum disturbance by centrifugal force.

My invention also embraces the provision of a novel and effective means for mounting the inner extremities or hub ends of the propeller blades on the propeller shaft, provision being made for counteracting the stresses due to the end and lateral thrusts occuring during flight.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawings of a form of the invention, which may be preferred, in which:

Figure 1 is a vertical, sectional view through the hub of the propeller and the inner ends of the blades, showing the means of my invention for varying the pitch of the blades;

Figure 2 is a detail sectional view taken substantially on a line 2—2 of Figure 1;

Figure 3 is a detail sectional view taken substantially on a line 3—3 of Figure 2;

Figure 4 is a front elevation of a portion of the hub mechanism;

Figure 5 is a detail sectional view.

The invention may be incorporated in any suitable propeller and hub construction, and for a practical application I have selected to illustrate the same as embodied in a propeller suitable for use in propelling aircraft, but it is to be understood that I do not wish to limit the utilization of my invention to the particular embodiment illustrated, and that I contemplate the use of the same wherever it may be found to be applicable.

Referring to the drawings in detail, a plate or member 1 is secured to the forward portion of the engine or airplane frame in a suitable manner. Extending from the member 1 is an annular flange 2 on which is rotatably mounted a ring-gear 3, the gear being journalled in suitable anti-friction bearings 4. Ring-gear 3, is adapted to be rotated from the cockpit of the aircraft (not shown), through the medium of shafts 5 and 8, and gears 7 and 9. Mounted on the shaft 10, which is driven by an engine or other prime mover (not shown) is a boss or hub portion 20 of a propeller. The hub 20 is provided with radially disposed tubular portions or sockets 25 open at their outer ends for reception of the cylindrical inner ends 30 of the propeller blades; the ends 30 being journalled in the sockets 25 by means of anti-friction bearings 60 and 61, and are rotatable axially by means hereinafter to be described.

Surrounding the shaft 10, and extending from and forming a part of the ring-gear 3, is a sleeve portion 12, provided with internal screw threads 14 preferably of the square type because of the stress imposed upon them. Mounted on the propeller hub 20 is an anti-friction bearing 11, the outer race of which has external screw threads which cooperate with threads 14 on sleeve 12. The guides 16, secured to plate 1, prevent the outer race 15 of bearing 11 from rotating during movement of the ring-gear 3, and the inner race 17 of bearing 11 is moved longitudinally on hub 20, being prevented from rotating by means of guides 18 secured thereto. The guides 18 are adapted for slidable movement in the grooves or serrations 19 formed in the hub 20 and have ring 21 secured to their outer ends.

The ring 21 is positioned in front of propeller hub 20, and secured near the periphery of the ring 21 are diametrically opposed guides 24 adapted to slide horizontally in extended portions 26 of the propeller hub, and which have diagonally disposed keys or cams 22 which cooperate with slots 27 in rings 28 and 29. The rings 28 and 29 fit around the extensions 26 of the hub 20 and rotate thereon. Opposite the slots 27 are extended portions 32 and 33 of rings 28 and 29 to which are secured arms 36, 37, 38 and 39 in some suitable manner such as by rivets 40. The ring 31, positioned behind the propeller hub 20 holds the guides 24 in position on the extensions 26. The rings 21 and 31 and the guides 24 form a carriage or cage for transmitting movement from the guides 18 to the arms 36, 37, 38 and 39.

Surrounding the sockets 25 are the sleeves or collars 34 and 35 formed with slots 47 coacting with guides 46 on the exterior of the hub sockets. The collars 34 and 35 are articulated by means of the arms 36, 37, 38 and 39 secured to the rings 28 and 29 mounted for oscillation on the circular extensions 26 of the hub. Members 18 horizontally disposed in slots 19 in the shaft 10 connect ring 21 and race 17 of the bearing 11. The members 18 are operated through the connections with bearing 11 which receives longitudinal movement by rotation of ring-gear 3.

As the propeller revolves with a substantially positive pitch to the blades, a strong force is set up tending to twist the blades to zero degrees of pitch. By using the centrifugal force acting upon the collars 34 and 35 when the propeller is in motion, I have found that the twisting stress or torque of the blade can be substantially counteracted. To this end I have provided slots 51 in the hub extensions 25, and slots 52 in the collars 34 and 35. Pins 53 secured to the end portion 30 of the propeller blade extend outwardly and are adapted to slide in slots 52, the slots being diagonal, impart the necessary movement. As will be seen from Figure 1, when collar 34 is moved outwardly on the extension 25, pin 53 will move to the left and the propeller blade will be rotated on its longitudinal axis. As the collars 34 and 35 move outwardly on the hub extension, the pitch of the blades increases and the centrifugal force of the collars 34 and 35 substantially balances or equalizes the twisting stresses or torque of the blades. A balance being obtained between these two forces, they will continue to substantially balance each other, with the result that except at zero degrees of pitch there will be little effort required to operate the mechanism in varying the degree of pitch of the blades.

The two halves of bearing races 62 and 68 are secured together by means of bolts 64 and 65, thus securely retaining the propeller blades in their sockets. The bearing races 62 and 63 are secured to the hub extension by means of the inwardly projecting flanged portions 66 and 67 which engage in the V-shaped grooves 68 and 69, in the external surface and near the extremities of the hub extensions. These bearings carry the radial thrust forces of the blades as well as to retain the blades in the sockets. The inner ends of the propeller blades contact with the hub 20 and are journalled in bearings 70 and 71, and these bearings can be replaced or adjusted through the openings 72 and 73, which openings I prefer to close by inserting the threaded members 74 and 75.

In the operation of my device, the shaft 5 is preferably adapted to be operated from the cockpit (not shown) of the aircraft or other vehicle, and rotation of the shaft is imparted to the sleeve 12 through gears 7, shaft 8 and gear 9. The rotation of sleeve 12 around propeller shaft 10, moves the bearing 11 to the left or right as viewed in Figure 1 depending upon direction of rotation of the shaft 5. The inner race 17 of bearing 11 is secured to the guide strips 18, which slide in grooves 19 in the hub 20, and, being connected to the ring 21, a correlated movement between ring 21 and bearing 11 is effected. Near the outer periphery of ring 21 are secured the guides 24 adapted for movement in slots 23 in the hub extension 26, and protruding diagonally across the guides 24 are the keys 22 coacting with the keyways 27 in rings 28 and 29 carried by the hub extensions 26. Thus the motion imparted to the guides 24 and keys 22 will cause rotation of the rings 28 and 29 in opposite directions due to the relative positions of the keys. Arms 36, 37, 38 and 39, secured to projections 32 and 33 of rings 28 and 29, and to arms 43 of the split collars 34 and 35, move the collars on the hub sockets 25, relative rotation of these collars being prevented by the keys 46. The diagonal slots 52 in the collars 34 and 35 cause the pins 53 secured in the propeller blades 30 to shift laterally in the slots 51 in the hub extensions 25, which shifting effects a change in the pitch of the propeller blades, by partially rotating the blades on their longitudinal axes. The centrifugal thrust of the blades is resisted by the bearings 60 and 61 and their collars or races 62 and 63, and this thrust is substantially balanced or offset by the collars 34 and 35, as the farther out the collars move from the axis of shaft 10, the greater the pitch of the propeller blades, and vice versa.

It is apparent that, within the scope of the invention, modifications and different arrangements may be made other than is herein disclosed, and the present disclosure is illustrative merely, the invention comprehending all variations thereof.

What I claim is:—

1. A propeller comprising a drive shaft and a hub, said hub having radially extending portions; blades journalled therein; means surrounding said extended portion to prevent axial movement of said blade; collars adapted to move on said extending portions, and operating connections between said collars and said blades adapted to rotate said blades about an axis transverse to the axis of said shaft, said operating connections comprising pin cams carried by said blades cooperating with cam slots in said collars and in said extending portions.

2. A propeller for aircraft comprising a drive shaft; a hub on said shaft; a blade adapted to rotate in said hub; means exteriorly of said hub to prevent axial movement of said blade; a cam pin on said blade; a collar on said hub; a cam slot in said collar coacting with said pin; and manually operated means connected to said pin and slot arrangement for turning said blade about an axis transverse to the axis of said shaft, said means including a rotatable element carried by said hub and an operating connection between said element and said collar.

3. A propeller for aircraft comprising a drive shaft; a hub on said shaft; an extension on said hub; a cam slot in said extension; a blade adapted to rotate in said hub; a cam pin on said blade; a collar on said hub; a cam slot in said collar coacting with said cam pin and first mentioned slot; means including a collar supported on said extension to prevent outward movement of said blade; and manually operated means connected to said cam pin and slot arrangement for turning said blade about an axis transverse to the axis of said shaft.

4. In a propeller the combination of a drive shaft; a hub on said shaft having an extension; a cam slot in said extension; a collar on said extension; a cam slot in said collar; a blade adapted to fit in said extension; a coacting cam member in said blade; and manually operated means for imparting motion to said blade through said cam slots and cam member, said means including a rotatable element carried by said hub and an operating connection between said element and said collar.

5. A propeller comprising a drive shaft and a hub, said hub having radially extended portions; blades secured therein; collars adapted to move on said extended portions; cam connections between said collars and said blades; and a cage movable axially of the shaft, said cage being connected to said collars to increase the pitch of the blade as the collars move to the extremities of said extended portions.

6. A propeller comprising a drive shaft and a hub, said hub having radially extending portions; blades secured therein; collars adapted to move on said extending portions, and operating connections between said collars and said blades adapted to move said blades about an axis transverse to said shaft, said operating connection comprising a cam pin in said blade and a cam slot in said collar; and a carriage movable axially of the shaft, said carriage being connected to said collars to move the latter along said hub to change the pitch of said blade.

7. A device of the character disclosed comprising in combination a drive shaft; a plurality of propeller blades carried upon said shaft; said propeller blades being relatively rotatable about an axis transverse to the axis of the said drive shaft; means for preventing axial movement of said blades, said means including a collar coacting with said blades; means for changing the angular position of said propeller blades; said means being arranged to substantially neutralize any force tending to change the adjusted position of said blades while in motion.

8. A device of the character disclosed comprising in combination a drive shaft; a hub mounted upon said shaft; a plurality of propeller blades mounted upon said hub; said propeller blades being relatively rotatable about an axis transverse to the axis of the said drive shaft; means for preventing axial movement of said blades including collars carried by said hub and coacting with said blades; means for changing the effective pitch of said propeller blades; said means being arranged in a manner whereby the centrifugal force acting upon a portion of the means substantially tends to counteract the tendency of the propeller blades to move to a different pitch angle while in motion.

9. A device of the character disclosed comprising in combination a drive shaft; a hub mounted upon said shaft; a plurality of propeller blades mounted upon said hub; means carried by said hub and coacting with said propeller blades to prevent axial movement of said blades; said blades when rotated tending to twist in one direction; said propeller blades being relatively rotatable about an axis transverse to the axis of said drive shaft; means movable axially of said blades for changing the effective pitch of said propeller blades by twisting said blades in the opposite direction.

10. A device of the character disclosed comprising in combination a drive shaft; a hub mounted upon said shaft; a plurality of propeller blades mounted upon said hub; a collar for preventing axial movement of each of said blades carried by said hub and coacting with said blades; said blades when rotated tending to twist to zero degree of pitch; said propeller blades being relatively rotatable about an axis transverse to the axis of said drive shaft; means movable axially of said blades for increasing the effective pitch of said propeller blades by twisting said blades in the opposite direction.

11. A device of the character disclosed comprising in combination a drive shaft; a hub mounted upon said shaft; a plurality of propeller blades mounted upon said hub; a plurality of collars carried by said hub and coacting with said blades to prevent axial movement of said blades; said blades when rotated tending to twist in one direction; means for relatively rotating said blades about an axis transverse to the axis of said drive shaft; and means movable axially of said blades to neutralize the force tending to twist said blades.

12. In a propeller structure, the combination of a shaft for rotating said propeller; a hub structure having extensions and carried by said shaft; adjustable blades mounted in said hub extensions; means for adjusting said blades while the propeller is in motion; said means including means movable axially of said shaft, means movable axially of said extensions and operating connections therebetween, and means on the exterior of said hub to positively position said blades with respect to said hub.

13. In a propeller structure, the combination of a shaft for rotating said propeller; a hub structure carried by said shaft; adjustable blades mounted in said hub; means for adjusting said blades while the propeller is in motion, said means including cam elements longitudinally movable of said shaft operatively associated with means carried by said hub for axially rotating said blades; and means carried on said hub to position said blades with respect to said hub.

14. In a propeller structure, the combination of a drive shaft; means carried by said shaft for supporting a propeller blade; means including a collar movable axially of said blade and operatively connected to a member movable axially of said shaft for adjusting the pitch of said blade; and means carried externally of said supporting means to prevent axial movement of said blade.

15. In a propeller structure, the combination of a drive shaft; a hub on said shaft provided with extensions for supporting a plurality of rotatable blades and having means positioned externally thereof to prevent axial movement of said blades; and means to rotate said blades including a member carried by said hub and movable axially thereof and a plurality of collars carried by and movable axially of said extensions.

16. In a propeller structure, the combination of a drive shaft; a hub on said shaft having blade supporting extensions; means including an anti-friction member carried by said hub and movable longitudinally of said shaft to rotate said blades in said extensions; and means externally of said extensions to prevent axial movement of said blades.

17. In a device of the character disclosed, the combination of a drive shaft; a hub on said shaft; a blade journalled in said hub substantially at right angles to the axis of said drive shaft; and means including a collar, an oscillatory ring supported on said hub, a link between said collar and ring, and manually operable means to oscillate said ring to actuate said link to rotate said blade.

18. A propeller including a hub mounted upon a drive shaft; a blade adapted for independent rotation in said hub; said hub having an extension; means including a collar supported on said extension to position said blade in said extension; a cam pin carried by said blade; and means including a slotted collar cooperating with said cam pin to rotate said blade about an axis transverse to the axis of said shaft.

19. In a propeller, the combination of a drive shaft; a hub on said shaft having an extension; a cam slot in said extension; a blade journalled in said extension; a cam pin carried by said blade cooperating with said cam slot in said extension; means for imparting motion to said blade through said cam slot and cam pin; and means including a collar supported on said extension to position said blade in said extension.

20. In a propeller, the combination of a drive shaft; a hub on said shaft having an extension; a cam slot in said extension; a collar having a cam slot therein positioned on said extension; a blade having a cam pin and being positioned within said extension; and means for actuating said collar for imparting motion to said blade through said cam slots and cam pin.

HAROLD A. FLETCHER.

DISCLAIMER 2,001,189.—*Harold A. Fletcher*, Chicago, Ill. CONTROLLABLE PITCH PROPELLER. Patent dated May 14, 1935. Disclaimer filed June 8, 1937, by the assignee, *Eclipse Aviation Corporation*.

Hereby enters this disclaimer to claims 11 and 12 of the specification.

[*Official Gazette June 29, 1937.*]